United States Patent
Kamiyama

(10) Patent No.: US 11,643,163 B2
(45) Date of Patent: May 9, 2023

(54) SADDLE-TYPE VEHICLE

(71) Applicant: HONDA MOTOR CO., LTD., Tokyo (JP)

(72) Inventor: Takeshi Kamiyama, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 354 days.

(21) Appl. No.: 16/877,694

(22) Filed: May 19, 2020

(65) Prior Publication Data
US 2020/0377166 A1 Dec. 3, 2020

(30) Foreign Application Priority Data
May 29, 2019 (JP) .............................. JP2019-100430

(51) Int. Cl.
| | |
|---|---|
| *B62J 43/20* | (2020.01) |
| *B62J 1/08* | (2006.01) |
| *B62K 11/04* | (2006.01) |
| *B62M 7/06* | (2006.01) |
| *B62K 5/01* | (2013.01) |

(52) U.S. Cl.
CPC .............. *B62K 11/04* (2013.01); *B62J 1/08* (2013.01); *B62J 43/20* (2020.02); *B62M 7/06* (2013.01); *B62K 5/01* (2013.01)

(58) Field of Classification Search
CPC ... B62J 43/20; B62J 1/08; B62M 7/06; B62K 5/01
See application file for complete search history.

(56) References Cited

U.S. PATENT DOCUMENTS

| | | | | |
|---|---|---|---|---|
| 7,018,091 | B2* | 3/2006 | Arroubi | A47J 43/0716 366/205 |
| 7,809,220 | B2* | 10/2010 | Kim | G02B 6/13 385/129 |
| 7,828,098 | B2* | 11/2010 | Yamamoto | B60R 16/04 180/908 |
| 2008/0257632 | A1 | 10/2008 | Takeshima et al. | |
| 2010/0206657 | A1* | 8/2010 | Makabe | B62K 5/01 180/446 |

FOREIGN PATENT DOCUMENTS

JP 2008-114617 A 5/2008

* cited by examiner

*Primary Examiner* — Tony H Winner
(74) *Attorney, Agent, or Firm* — Paratus Law Group, PLLC

(57) ABSTRACT

A saddle-type vehicle includes an engine, an engine control device, a battery, a vehicle body frame, and a pair of rear wheels. The vehicle body frame includes a pair of seat support frames supporting a seat. The battery is disposed below the seat and between the pair of seat support frames in a vehicle width direction. The engine control device is disposed between a seat support frame of the pair of seat support frames and a rear wheel of the pair of rear wheels. The seat support frame is located on one side in the vehicle width direction, and the rear wheel is located on the one side. At least a part of the engine control device overlaps the rear wheel located on the one side when viewed from the vehicle width direction.

7 Claims, 8 Drawing Sheets

SADDLE-TYPE VEHICLE

CROSS-REFERENCE TO RELATED APPLICATIONS

This application is based on and claims priority under 35 USC 119 from Japanese Patent Application No. 2019-100430 filed on May 29, 2019.

TECHNICAL FIELD

The present invention relates to a saddle-type vehicle.

BACKGROUND ART

As a saddle-type vehicle, an all-terrain vehicle having a pair of front wheels and a pair of rear wheels is known. An engine control device (for example, an ECU) that controls an engine which is a driving source, and a battery that supplies electric power to the engine control device are mounted on the all-terrain vehicle.

In such an all-terrain vehicle, the battery and the engine control device are generally arranged in a space below a seat and between seat rails so as not to be exposed outside, but the space below the seat and between the seat rails is narrow. Therefore, in a saddle-type vehicle described in JP-A-2008-114617 (Patent Literature 1), a battery and an engine control device are arranged side by side in front and rear so as to be compactly accommodated in the space.

SUMMARY OF INVENTION

However, in the saddle-type vehicle described in the Patent Literature 1, although there is an advantage that a length of a harness connecting the battery and the engine control device can be shortened, since both of the battery and the engine control device are heat generating members, heat dissipation and heat resistance are necessary to be considered. Further, if a large space under the seat can be ensured, the assemblability and maintenance performance can be improved.

The present invention provides a saddle-type vehicle in which heat generating members can be separated from each other and a wide under-seat space can be ensured.

The present invention relates to a saddle-type vehicle including:
  an engine;
  an engine control device configured to control the engine;
  a battery connected to the engine control device;
  a vehicle body frame supporting the engine and the battery; and
  a pair of rear wheels swingably supported by the vehicle body frame,
  wherein the vehicle body frame includes a pair of seat support frames supporting a seat,
  wherein the battery is disposed below the seat and between the pair of seat support frames in a vehicle width direction,
  wherein the engine control device is disposed between a seat support frame of the pair of seat support frames and a rear wheel of the pair of rear wheels, the seat support frame being located on one side in the vehicle width direction, the rear wheel being located on the one side, and
  wherein at least a part of the engine control device overlaps the rear wheel located on the one side when viewed from the vehicle width direction.

According to the present invention, the battery and the engine control device which are heat generating members can be separated from each other, and a wide under-seat space can be ensured. Further, the engine control device can be laid out in a dead space that is hardly exposed to the outside.

DESCRIPTION OF EMBODIMENTS

Figure 1:
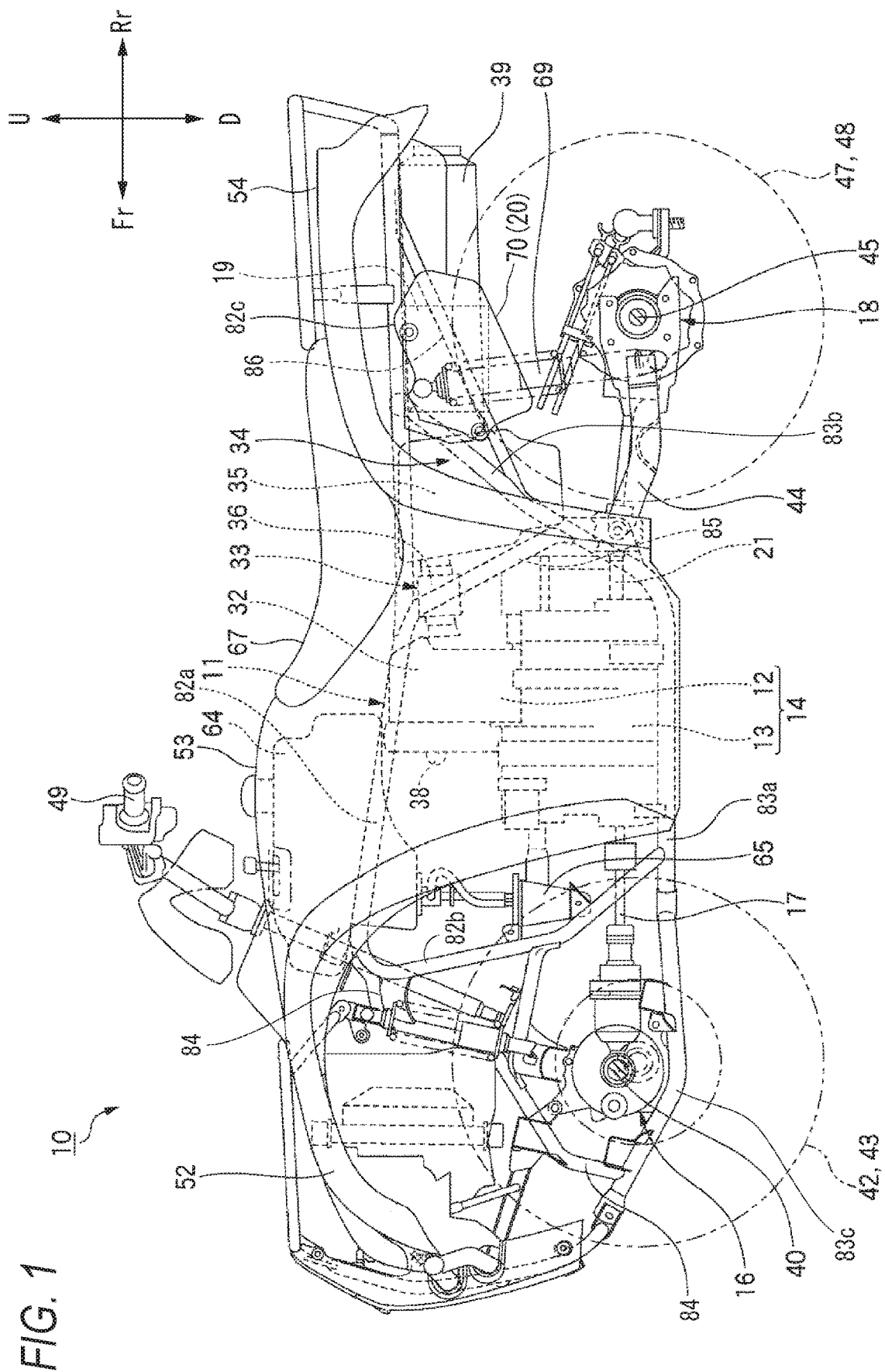
FIG. 1 is a side view of a saddle-type vehicle according to an embodiment of the present invention.

Hereinafter, a saddle-type vehicle according to an embodiment of the present invention will be described with reference to the accompanying drawings. The drawings should be seen based on a direction of reference numerals, and a front side of the saddle-type vehicle is denoted by Fr, a rear side is denoted by Rr, an upper side is denoted by U, a lower side is denoted by D, a left side is denoted by L, and a right side is denoted by R.

Figure 2:
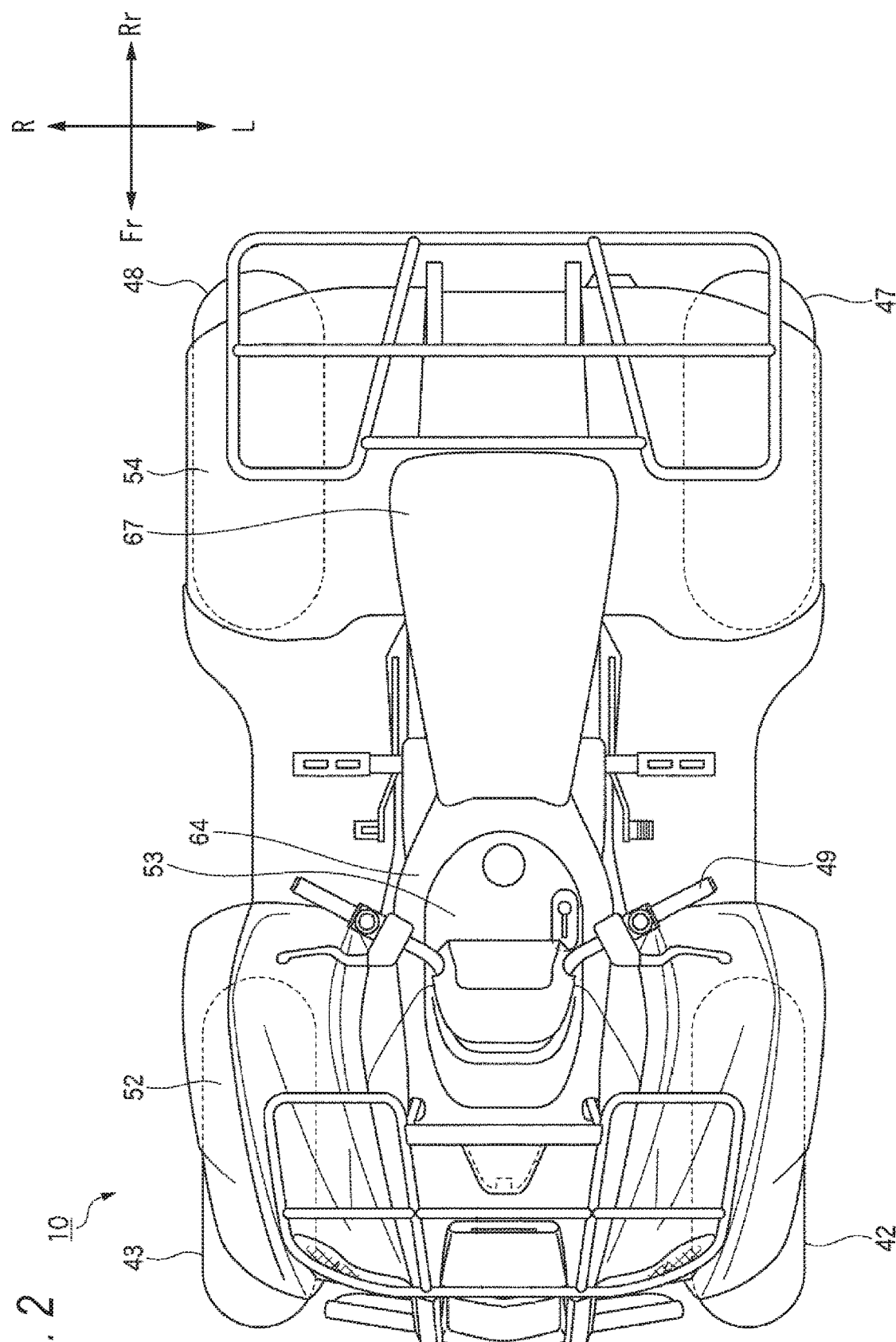
FIG. 2 is a plan view of the saddle-type vehicle shown in FIG. 1.

First, an overall configuration of a saddle-type vehicle 10 (hereinafter, referred to as a vehicle 10) will be described with reference to FIGS. 1 and 2. As shown in FIGS. 1 and 2, the vehicle 10 is an all-terrain vehicle (ATV) of a four-wheel drive system in which a power unit 14 including an engine 12 and a transmission 13 that are disposed in an upper-lower direction substantially at a center of a vehicle body frame 11, the transmission 13 is coupled to a front final assembly 16 disposed on a front side of the power unit 14 by a front propeller shaft 17, and the transmission 13 is coupled to a rear final assembly 18 disposed on a rear side of the power unit 14 by a rear propeller shaft 21.

The vehicle body frame 11 is formed by integrally joining a plurality of types of steel materials by welding or the like. Specifically, the vehicle body frame 11 forms a box structure that is long in a front-rear direction at a center portion in a vehicle width direction, in which a pair of left and right closed loop structures is formed and joined via a plurality of cross members.

The vehicle body frame 11 forms, respectively on the left and right, a closed loop with a main frame 82a that is slightly inclined rearward and downward extends rearward on an upper side of the engine 12, a front down frame 82b that extends slightly rearward and downward from a front portion of the main frame 82a, a lower frame 83a that extends rearward from a lower portion of the front down frame 82b through a lower side of the engine 12, a rear up frame 83b that extends from a rear portion of the lower frame 83a and is inclined rearward and upward, and a rear down frame 85 that extends rearward and downward from a rear portion of the main frame 82a. A pair of seat support frames 82c extends substantially horizontally rearward from the rear portion of the pair of main frames 82a, and supports a seat 67 on the upper portion thereof. The rear up frame 83b is connected to substantially the center of each seat support frame 82c.

From the front side of the main frame 82a, front sub-frames 84 that extend while bending toward a front lower frame 83c that extends substantially horizontally forward from the front portion of the lower frame 83a respectively extend. The rear up frames 83b are respectively connected with the rear down frames 85, and are respectively connected with the rear sub-frames 86 extending forward and downward from the rear portion of the seat support frames 82c.

When viewed from the vehicle width direction, the engine 12 is supported by the vehicle body frame 11 in a region (the closed loop) surrounded by the main frames 82a, the front down frames 82b, the lower frames 83a, the rear up frames 83b, and the rear down frames 85, and a cylinder portion 32 of the engine 12 is connected to an intake device 33 and an exhaust device 34. The engine 12 is controlled by an ECU 20 as an engine control device described later. The intake device 33 includes an air cleaner 35, a throttle body 36, and an intake duct (not shown), and the exhaust device 34 includes an exhaust pipe 38 and a muffler 39.

The front final assembly 16 is a device coupled to left and right front wheels 42, 43 via a pair of left and right drive shafts 40.

The rear final assembly 18 is swingably supported by a swing arm 44, and is a device coupled to left and right rear wheels 47, 48 via a pair of left and right drive shafts 45.

The vehicle body frame 11 is generally covered by a front cover 52 that covers a front portion of the vehicle body frame 11 and the upper side and the rear side of the front wheels 42, 43, a body cover 53 that covers an intermediate portion of the vehicle body frame 11 at the rear side of the front cover 52, and a rear cover 54 that covers a rear portion of the vehicle body frame 11 and the front side and the upper side of the rear wheels 47, 48.

In FIG. 1, reference numeral 49 denotes a bar handle for steering the front wheels 42, 43, reference numeral 64 denotes a fuel tank, reference numeral 65 denotes a fuel pump, and reference numeral 69 denotes a rear cushion unit cross a seat support frame 82c side and a swing arm 44 side.

Figure 3:
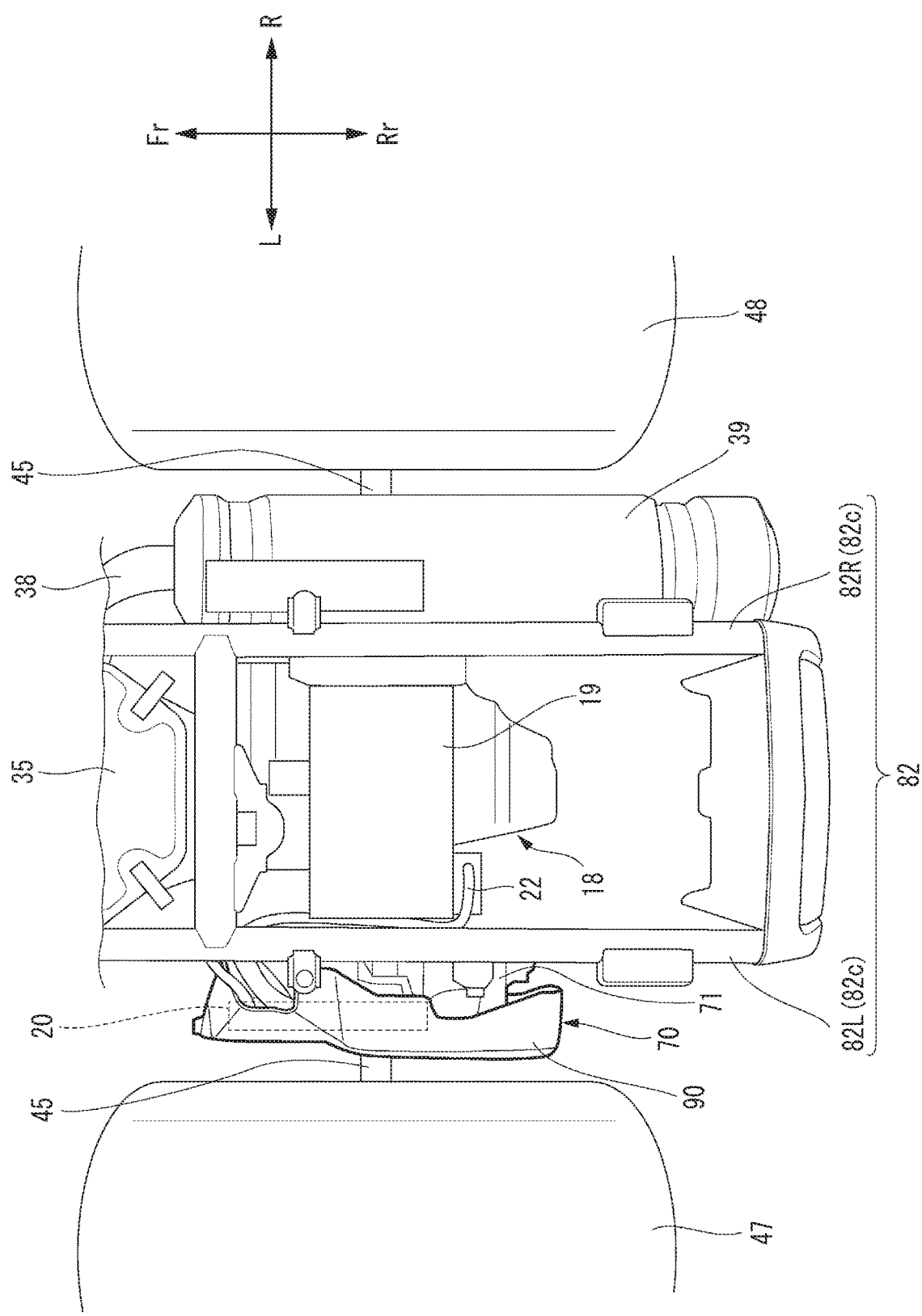
FIG. 3 is a plan view showing a rear part of the saddle-type vehicle shown in FIG. 1 with a rear cover removed.

Here, as shown in FIG. 3, the ECU 20 as the engine control device described above is disposed between the seat support frame 82c located on the left side of the pair of seat support frames 82c (hereinafter, referred to as a left seat support frame 82L), and the rear wheel 47 located on the left side of the pair of rear wheels 47 and 48 (hereinafter, referred to as a left rear wheel 47). Further, as shown in FIG. 4, at least a part of the ECU 20 overlaps with the left rear wheel 47 when viewed from the vehicle width direction.

In this way, the ECU 20 is disposed between the left seat support frame 82L and the left rear wheel 47, so that a space formed under the seat 67 and between the pair of seat support frames 82c in the vehicle width direction (hereinafter, referred to as a under-seat space) can be widely secured. Further, at least a part of the ECU 20 overlaps with the left rear wheel 47, so that the ECU 20 is hardly exposed to the outside, and the influence on the design of the appearance can be prevented.

Figure 4:
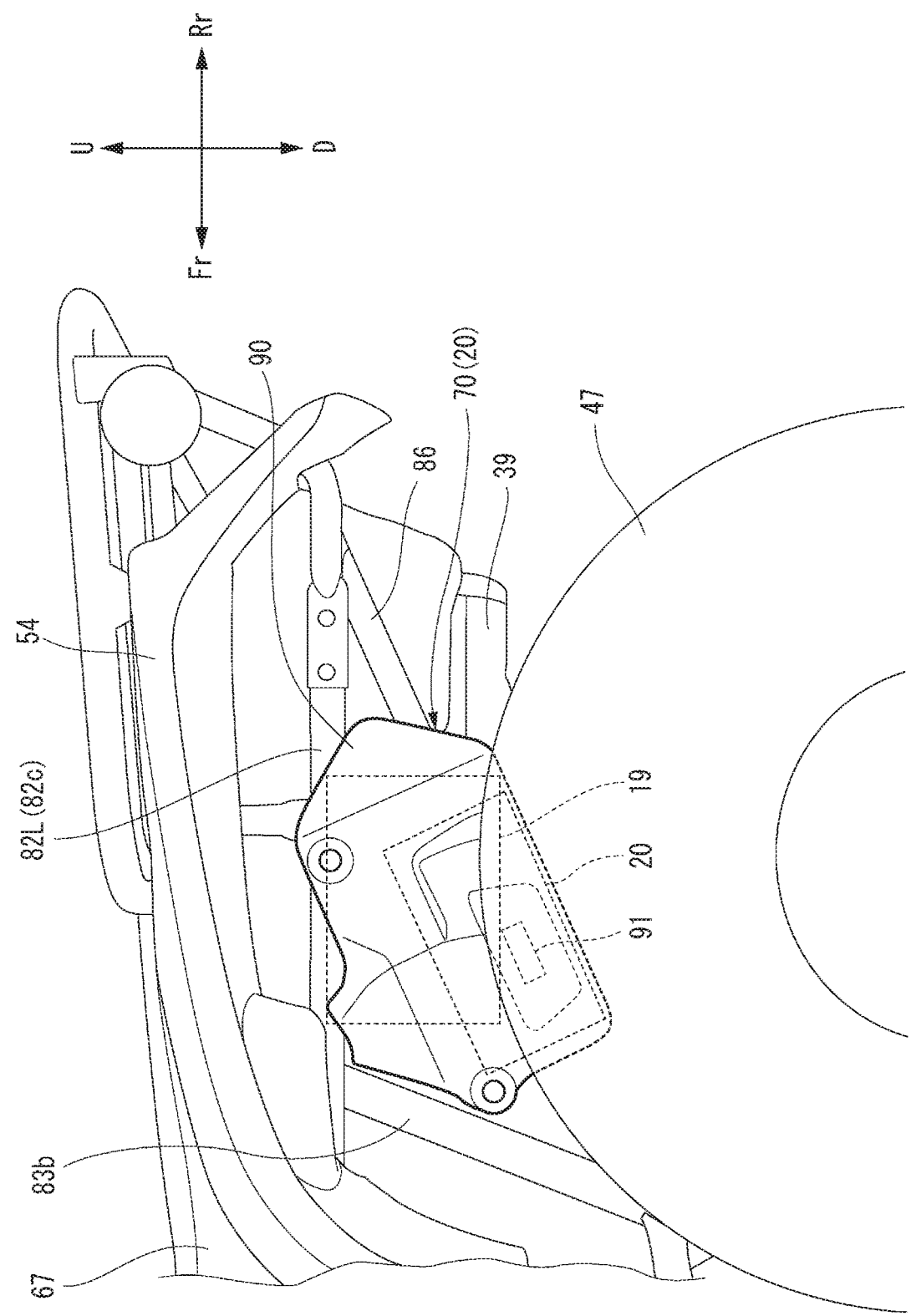
FIG. 4 is a side view of a left rear part of the saddle-type vehicle shown in FIG. 1.
Figure 6:
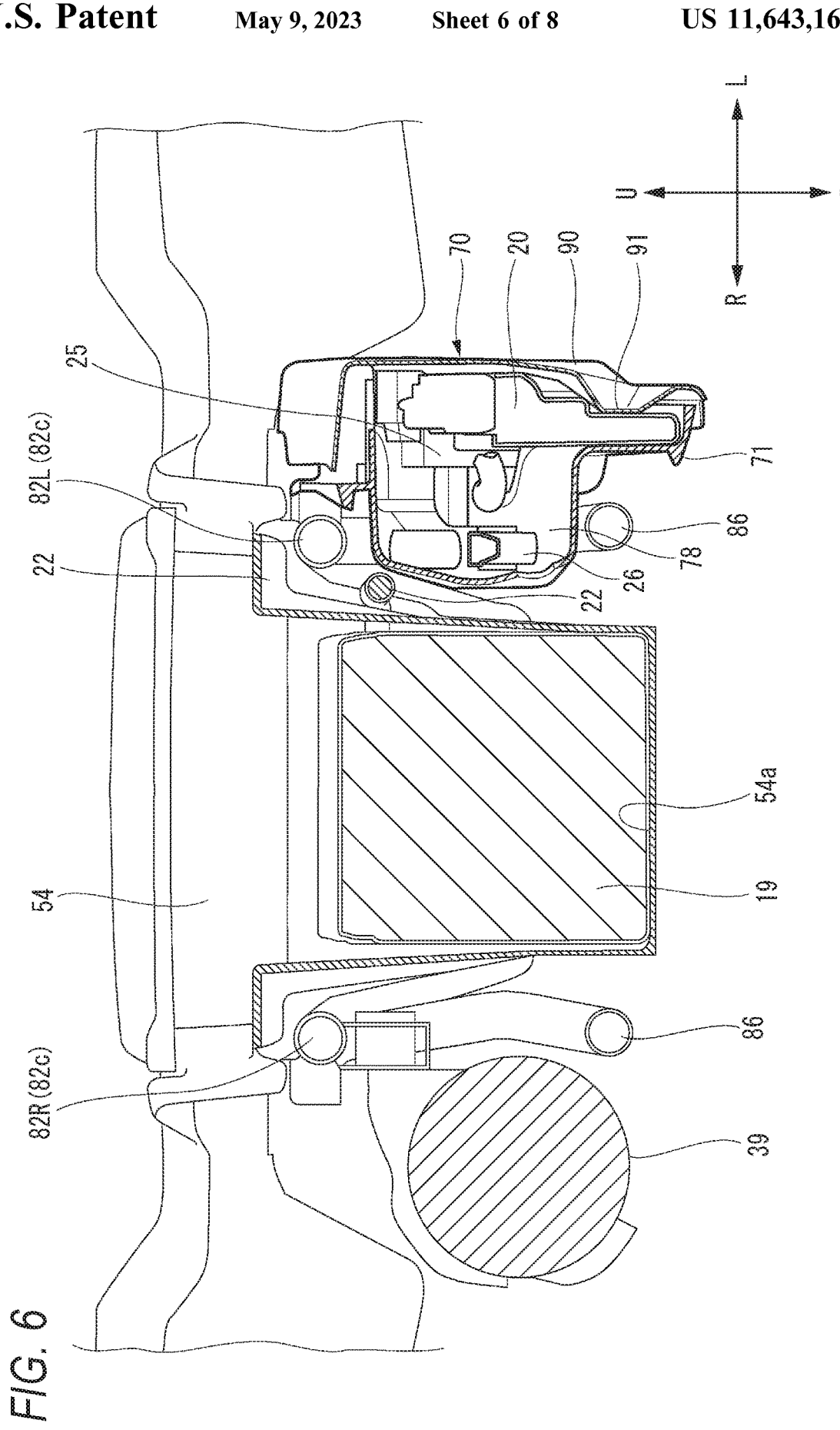
FIG. 6 is a sectional view of the rear part of the saddle-type vehicle shown in FIG. 1.

As shown in FIGS. 3 and 4, a battery 19 that supplies power to the ECU 20 via a harness 22 is disposed in the under-seat space. As shown in FIG. 6, the battery 19 is supported by the vehicle body frame 11 in a state of being accommodated in a battery accommodation portion 54a provided in the rear cover 54. When the battery 19 and the ECU 20 are viewed from the front-rear direction of the vehicle 10, the battery 19 and the ECU 20 are disposed with the left seat support frame 82L interposed therebetween. Therefore, the battery 19 and the ECU 20 which are heat generating members can be disposed apart from each other. Further, since the ECU 20 is not disposed in the under-seat space, a space is secured around the battery 19, so that the assemblability and maintenance performance of the battery 19 are improved.

As shown in FIGS. 4 and 6, at least a part of the ECU 20 overlaps with the battery 19 when viewed from the vehicle width direction. Therefore, a distance of the harness 22 connecting the battery 19 and the ECU 20 can be shortened while the battery 19 and the ECU 20 are disposed apart from each other.

Figure 5:
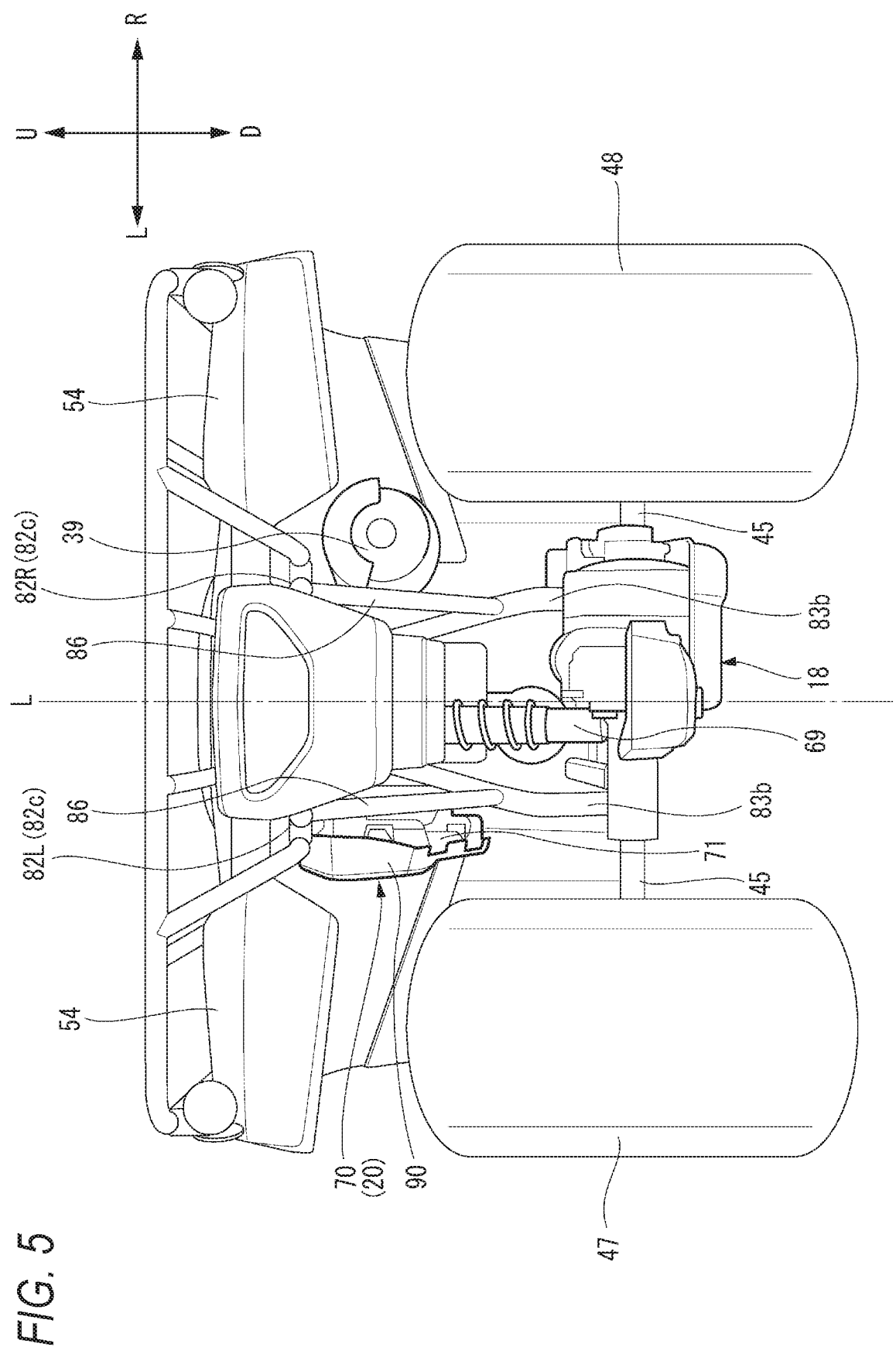
FIG. 5 is a rear view of the saddle-type vehicle shown in FIG. 1.

As shown in FIG. 5, the muffler 39 extending from the engine 12 is disposed on the side opposite to the ECU 20, that is, between the seat support frame 82c located on the right side of the pair of seat support frames 82c (hereinafter referred to as a right seat support frame 82R), and the rear wheel 48 located on the right side of the pair of rear wheels 47, 48 (hereinafter, referred to as a right rear wheel 48). In this way, the ECU 20 is disposed between the left seat support frame 82L and the left rear wheel 47, and the muffler 39 is disposed between the right seat support frame 82R and the tight rear wheel 48, so that a dead space formed between the rear wheels 47, 48 and the seat support frames 82c can be effectively used, and further, the right and left balance can be appropriately kept while the muffler 39 which generates a large amount of heat can be separated from the ECU 20.

Figure 7:
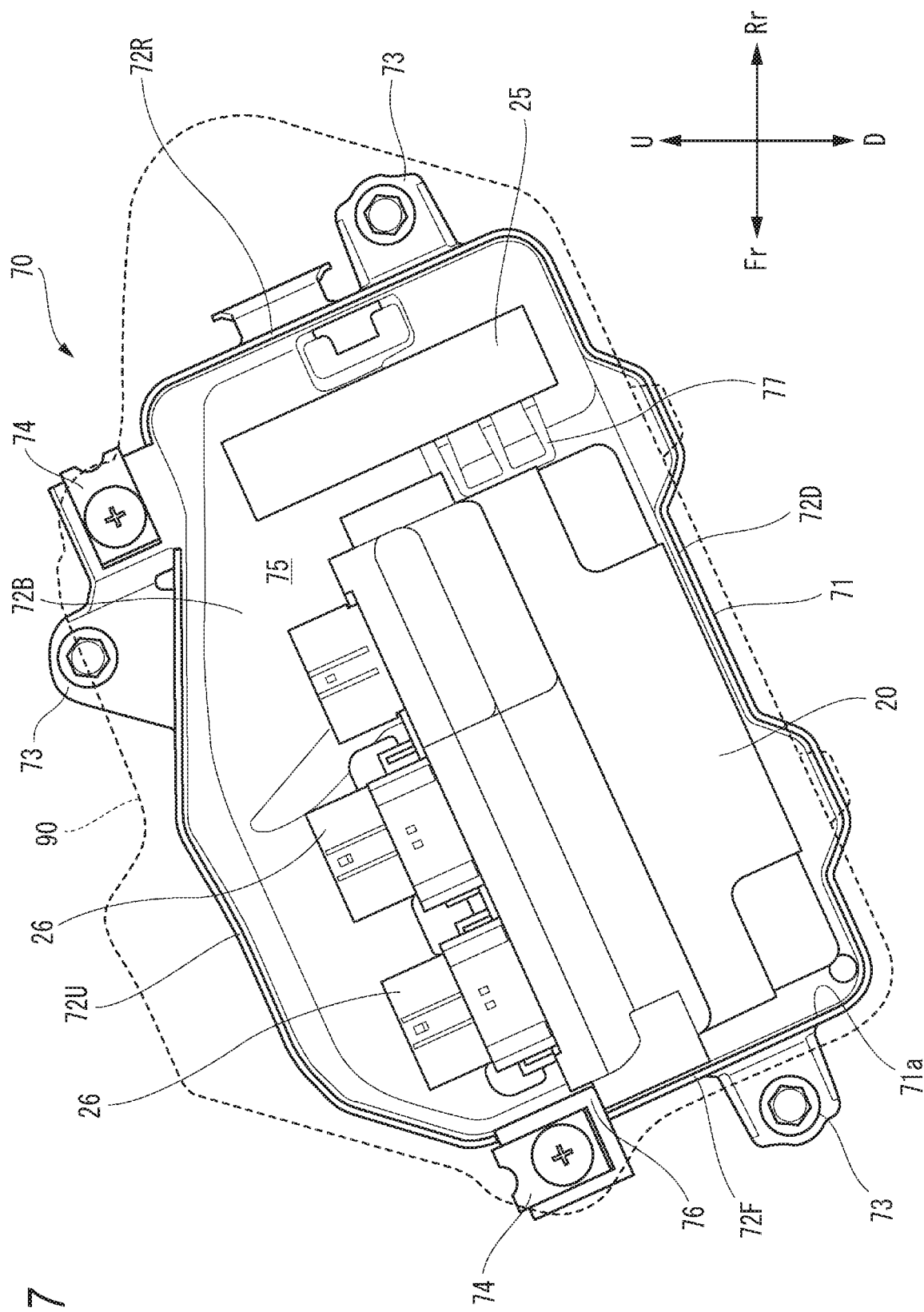
FIG. 7 is a side view of an engine control device accommodated in a case as viewed from a left side.
Figure 8:
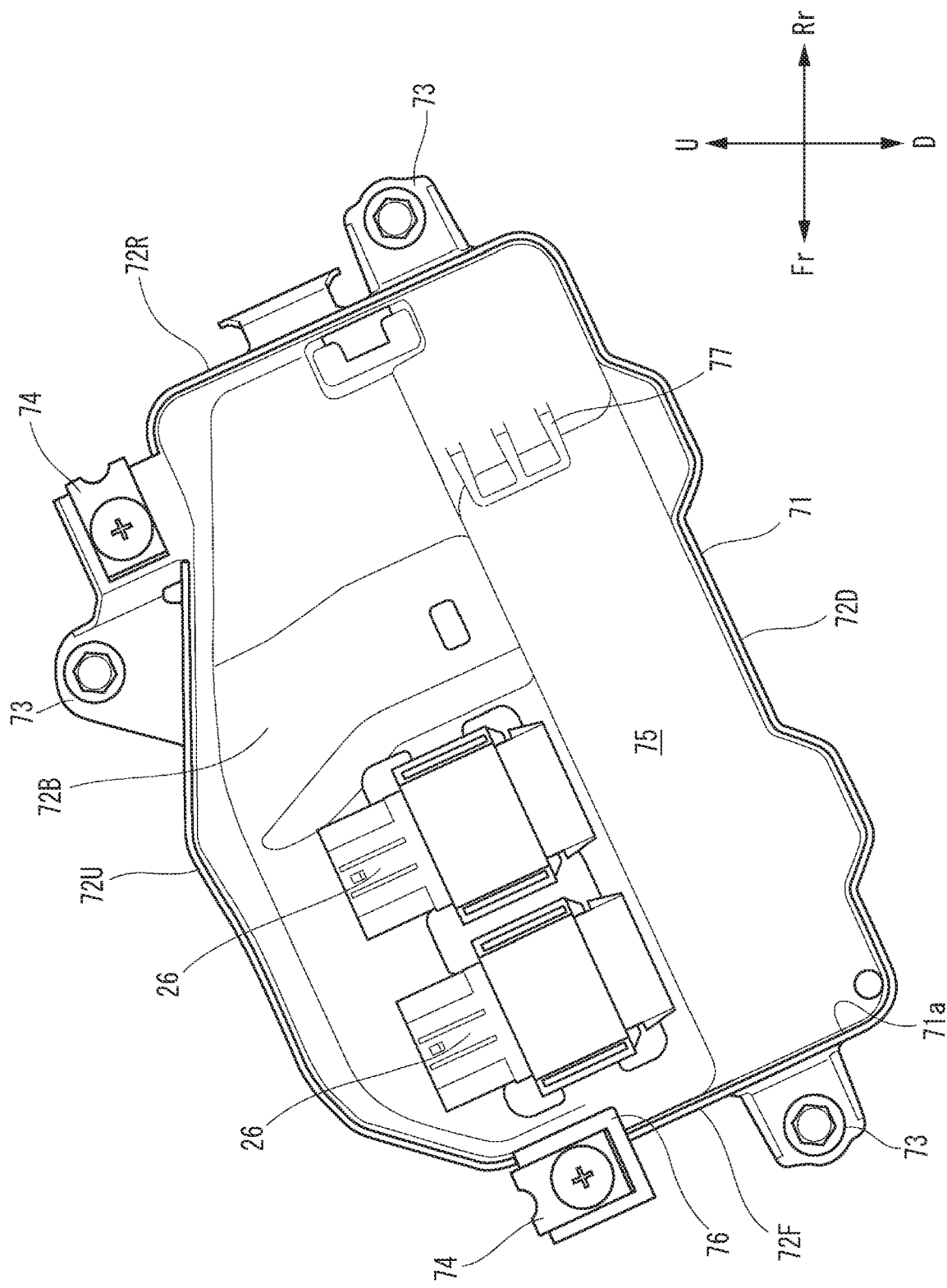
FIG. 8 is a side view showing the case of FIG. 7 with the engine control device removed.

Next, a support structure of the ECU 20 will be specifically described with reference to FIGS. 6 to 8.

The ECU 20 is accommodated in the case 70. The case 70 includes a bottomed cylindrical case main body 71 and a cover member 90 covering an opening 71a of the case main body 71. The case main body 71 includes a bottom surface 72B having a substantially rectangular shape when viewed from the vehicle width direction, and a front wall 72F, a rear wall 72R, an upper wall 72U, and a lower wall 72D which are standing upright from an outer edge of the bottom surface 72B. The opening 71a defined by the front wall 72F, the rear wall 72R, the upper wall 72U, and the lower wall 72D is covered with the cover member 90. The case main body 71 is fixed to the vehicle body by three fixing portions 73 separately provided on the lower side of the front wall 72F, on the lower side of the rear wall 72R, and on the upper side of the upper wall 72U such that the opening 71a faces the left side, and the cover member 90 is fixed to two fastening portions 74 provided on the upper side of the front wall 72F and on the rear side of the upper wall 72U.

The ECU 20 is accommodated in a case accommodation portion 75 formed by covering the opening 71a of the case main body 71 with the cover member 90. The ECU 20 is positioned in the front-rear direction by a front positioning portion 76 formed by a corner of the fastening portion 74 provided on the upper side of the front wall 72F, and is positioned in the upper-lower direction by a rear positioning portion 77 disposed on the rear side of the bottom surface 72B. As shown in FIGS. 1 and 6, the cover member 90 is provided with a cover protruding portion 91 having a substantially quadrangular pyramid shape and protruding toward the bottom surface 72B of the case main body 71 at a front lower portion, so that the ECU 20 positioned in the case accommodation portion 75 in the front-rear direction by the front positioning portion 76 and in the upper-lower direction by the rear positioning portion 77 is held between the bottom surface 72B of the case main body 71 and the cover protruding portion 91 of the cover member 90. As described above, the ECU 20 is held between the case main body 71 and the cover member 90, so that a dedicated component for fixing the ECU 20 becomes unnecessary, and an increase in the number of components can be prevented. A cushioning member such as an elastic material is preferably interposed between the case main body 71 and the cover member 90.

In the case accommodation portion 75, electric components such as a fuse 25 and two relays 26 are disposed together with the ECU 20. The fuse 25 is disposed between the rear positioning portion 77 and the rear wall 72R. The two relays 26 are arranged in the front and rear in a case protruding portion 78 formed on an upper portion of the bottom surface 72B of the case main body 71 and protruding to the inner side (a direction away from the cover member 90).

The case 70 configured as described above is fixed to the vehicle body by the three fixing portions 73 so as to be lowered forward. At this time, as shown in FIG. 6, the case protruding portion 78 overlaps the left seat support frame 82L in the vehicle width direction when viewed from the front-rear direction. More specifically, the case protruding portion 78 is located between the left seat support frame 82L and the rear sub-frame 86 on the left side in the upper-lower direction when viewed from the front-rear direction. Therefore, the space below the left seat support frame 82L can be effectively used.

The case 70 is arranged so as to be positioned within a width in the front-rear direction of the rear wheels 47, 48 when viewed from the vehicle width direction as shown in FIG. 4. Therefore, the case 70 is prevented from protruding from the rear wheels 47, 48 in the front-rear direction.

As shown in FIG. 5, when viewed from the rear side of the vehicle 10, with respect to a center line L in the left-right direction of the vehicle 10, the rear final assembly 18 that accommodates a final gear is located on the right side, and the rear cushion unit 69 is located on the left side. Referring to FIG. 4 as well, a lower end portion of the case 70 is located lower than a lower end portion of the muffler 39 when viewed from the vehicle width direction. Therefore, the rear final assembly 18 having a large radial dimension is disposed on the muffler 39 side, so that the influence of the swing of the rear wheels 47, 48 can be reduced.

Although the embodiment of the present invention has been described above, the present invention is not limited to the above-described embodiment, and modifications, improvements, or the like can be made as appropriate. For example, in the above embodiment, the ECU 20 is disposed on the left side and the muffler is disposed on the right side of the vehicle 10, but the invention is not limited thereto, and the muffler 39 may be disposed on the left side and the ECU 20 may be disposed on the right side.

At least the following subject matters are described in this specification. Corresponding components in the above embodiment are shown in parentheses. However, the present invention is not limited thereto.

(1) A saddle-type vehicle (10), including:
an engine (engine 12);
an engine control device (ECU 20) configured to control the engine;
a battery (battery 19) connected to the engine control device;
a vehicle body frame (vehicle body frame 11) supporting the engine and the battery; and
a pair of rear wheels (rear wheels 47, 48) swingably supported by the vehicle body frame,
wherein the vehicle body frame includes a pair of seat support frames (seat support frames 82c) supporting a seat (seat 67),
wherein the battery is disposed below the seat and between the pair of seat support frames in a vehicle width direction,
wherein the engine control device is disposed between a seat support frame (left seat support frame 82L) of the pair of seat support frames and a rear wheel (left rear wheel 47) of the pair of rear wheels, the seat support frame being located on one side in the vehicle width direction, the rear wheel being located on the one side, and
wherein at least a part of the engine control device overlaps the rear wheel located on the one side when viewed from the vehicle width direction.

According to (1), the engine control device is disposed between the seat support frame located on the one side in the vehicle width direction and the rear wheel located on the one side, so that a dead space is effectively used, and a large space below the seat where the battery is disposed can be secured. The battery and the engine control device are disposed such that the seat support frame located on the one side is interposed therebetween, so that the heat generating members can be apart from each other. Further, at least a part of the engine control device overlaps the rear wheel located on the one side when viewed from the vehicle width direction, so that the engine control device is hardly exposed to the outside, and the influence on the design of the appearance can be prevented.

(2) In the saddle-type vehicle according to (1),
the engine control device is accommodated in a case (case 70).

According to (2), the engine control device is accommodated in the case, so that the engine control device can be protected by the case.

(3) In the saddle-type vehicle according to (2),
the case includes a case main body (case main body 71) and a cover member (cover member 90) covering an opening (opening 71a) of the case main body, and
the engine control device is held between the case main body and the cover member.

According to (3), the engine control device is held between the case main body and the cover member, so that a dedicated component for fixing the engine control device becomes unnecessary, an increase in the number of components can be prevented, and assembly can be performed easily.

(4) In the saddle-type vehicle according to (2) or (3),
the case includes a case main body (case main body 71) and a cover member (cover member 90) covering an opening (opening 71a) of the case main body,
the case main body includes a case protruding portion (case protruding portion 78) overlapping the seat support frame in the vehicle width direction when viewed from a front-rear direction, and
an electrical component (relay 26) is on the case protruding portion.

According to (4), the case main body includes the case protruding portion overlapping the seat support frame in the vehicle width direction when viewed from a front-rear direction, and the electrical component is on the case protruding portion, so that the space below the seat support frame can be effectively used.

(5) In the saddle-type vehicle according to any one of (2) to (4), the case is within a width in a front-rear direction of the pair of rear wheels when viewed from the vehicle width direction.

According to (5), the case is within the width in the front-rear direction of the pair of rear wheels when viewed from the vehicle width direction, so that the case is prevented from protruding from the rear wheels in the front-rear direction.

(6) In the saddle-type vehicle according to any one of (1) to (5), at least a part of the engine control device is configured to overlap the battery when viewed from the vehicle width direction.

According to (6), at least a part of the engine control device is configured to overlap the battery when viewed from the vehicle width direction, so that a distance of a harness connecting the battery and the engine control device can be shortened.

(7) The saddle-type vehicle according to any one of (1) to (4) further includes:

a muffler (muffler 39) extending from the engine, wherein the muffler is disposed between a seat support frame (right seat support frame 82R) of the pair of seat support frames, and a rear wheel (right rear wheel 48) of the pair of rear wheels, the seat support frame being located on the other side in the vehicle width direction, and the rear wheel being located on the other side.

According to (7), the battery is disposed between the seat support frame on the one side and the rear wheel in the vehicle width direction, and the muffler is disposed between the seat support frame on the other side and the rear wheel, so that the right and left balance can be appropriately kept while the muffler which generates a large amount of heat can be separated from the engine control device.

What is claimed is:

1. A saddled vehicle, comprising:
    an engine;
    an engine control device configured to control the engine;
    a battery connected to the engine control device;
    a vehicle body frame supporting the engine and the battery; and
    a pair of rear wheels swingably supported by the vehicle body frame,
    wherein the vehicle body frame comprises a pair of seat support frames supporting a seat,
    wherein the battery is disposed below the seat and between the pair of seat support frames in a vehicle width direction,
    wherein the engine control device is disposed between a first seat support frame of the pair of seat support frames and a first rear wheel of the pair of rear wheels, the first seat support frame being located on one side in the vehicle width direction, the first rear wheel being located on the one side, and
    wherein at least a part of the engine control device overlaps the first rear wheel located on the one side when viewed from the vehicle width direction.

2. The saddled vehicle according to claim 1,
    wherein the engine control device is accommodated in a case.

3. The saddled vehicle according to claim 2,
    wherein the case comprises a case main body and a cover member covering an opening of the case main body, and
    wherein the engine control device is held between the case main body and the cover member.

4. The saddled vehicle according to claim 2,
    wherein the case comprises a case main body and a cover member covering an opening of the case main body,
    wherein the case main body comprises a case protruding portion overlapping the seat support frame in the vehicle width direction when viewed from a front-rear direction, and
    wherein an electrical component is on the case protruding portion.

5. The saddled vehicle according to claim 2,
    wherein the case is within a width in a front-rear direction of the pair of rear wheels when viewed from the vehicle width direction.

6. The saddled vehicle according to claim 1,
    wherein at least a part of the engine control device is configured to overlap the battery when viewed from the vehicle width direction.

7. The saddled vehicle according to claim 1, further comprising:
    a muffler extending from the engine,
    wherein the muffler is disposed between a second seat support frame of the pair of seat support frames, and a second rear wheel of the pair of rear wheels, the second seat support frame being located on another side in the vehicle width direction, and the second rear wheel being located on another side.

* * * * *